United States Patent
Kennedy et al.

(10) Patent No.: US 9,117,090 B2
(45) Date of Patent: Aug. 25, 2015

(54) SYSTEM AND METHOD FOR A SECURE DATA COLLECTION SYSTEM

(75) Inventors: Terence G. Kennedy, Darmstadt (DE); David Falla Cepeda, Darmstadt (DE)

(73) Assignee: Software AG, Inc., Darmstadt (DE)

( * ) Notice: Subject to any disclaimer, the term of this patent is extended or adjusted under 35 U.S.C. 154(b) by 115 days.

(21) Appl. No.: 13/082,617

(22) Filed: Apr. 8, 2011

(65) Prior Publication Data
US 2012/0191980 A1 Jul. 26, 2012

Related U.S. Application Data

(60) Provisional application No. 61/435,051, filed on Jan. 21, 2011.

(51) Int. Cl.
G06F 21/00 (2013.01)
G06F 21/62 (2013.01)
G06F 21/31 (2013.01)
H04L 29/06 (2006.01)

(52) U.S. Cl.
CPC .......... *G06F 21/6236* (2013.01); *G06F 21/31* (2013.01); *H04L 63/083* (2013.01)

(58) Field of Classification Search
CPC .............................. G06F 21/31; H04L 63/083
USPC .................. 713/183; 715/735; 718/1; 726/19
See application file for complete search history.

(56) References Cited

U.S. PATENT DOCUMENTS

| | | | | |
|---|---|---|---|---|
| 8,108,914 B2* | 1/2012 | Hernoud et al. | | 726/5 |
| 8,141,075 B1* | 3/2012 | Chawla et al. | | 718/1 |
| 2008/0059495 A1* | 3/2008 | Kiessig et al. | | 707/100 |
| 2010/0083371 A1* | 4/2010 | Bennetts et al. | | 726/19 |
| 2010/0098256 A1* | 4/2010 | Kirshenbaum | | 380/277 |
| 2010/0115288 A1* | 5/2010 | Monk et al. | | 713/189 |
| 2010/0146618 A1* | 6/2010 | DelRocco et al. | | 726/12 |
| 2010/0223654 A1* | 9/2010 | Kwan et al. | | 726/1 |
| 2010/0281207 A1* | 11/2010 | Miller et al. | | 711/103 |
| 2010/0332990 A1* | 12/2010 | Prahlad et al. | | 715/735 |
| 2011/0029634 A1* | 2/2011 | Gimson et al. | | 709/217 |
| 2011/0141508 A1* | 6/2011 | Inoue et al. | | 358/1.13 |
| 2011/0145817 A1* | 6/2011 | Grzybowski | | 718/1 |
| 2012/0023233 A1* | 1/2012 | Okamoto et al. | | 709/226 |
| 2012/0136732 A1* | 5/2012 | McMillen et al. | | 705/16 |

* cited by examiner

*Primary Examiner* — Chris Parry
*Assistant Examiner* — Weiwei Stiltner
(74) *Attorney, Agent, or Firm* — Venable LLP; Jeffri A. Kaminski; George L. Howarah

(57) ABSTRACT

The system may provide for the collection of data in a heterogeneous network, long term secure storage of the data, and secure transfer of the data to an environment that may be secure and controlled for the purpose of controlled and secure selected viewing of all or parts of the data. The data stored may include core data of interest as well as any data that is associated with the core data. The core data and associated data may be stored. To do so, the system may identify and collect associated data at the point of release of all or part of the data. Further, the system may provide secure and controlled transfer of the data to a permanent and secure media. Lastly, the system may provide secure transfer of all or parts of the data from the media to a controlled and secure environment suitably constructed to provide for secure viewing of all or parts of the data under the control of the owner of the data.

15 Claims, 11 Drawing Sheets

SYSTEM AND METHOD FOR A SECURE DATA COLLECTION SYSTEM

CROSS-REFERENCE TO RELATED APPLICATION

This application claims priority to U.S. Provisional Application No. 61/435,051 filed Jan. 21, 2011, the entire contents of which are hereby incorporated by reference.

BACKGROUND OF THE INVENTION

1. Field of the Invention

Embodiments of the present invention relates generally to collecting data, and more particularly to systems, methods, and computer-program products for secure data collection.

2. Related Art

Many companies today have expanded (e.g., through acquisition of other companies, outsourcing, or diversification, etc.) such that parts of companies may be located in different locations around the world. In addition, company infrastructure has become much more complicated. As such, companies face an ever increasing set of problems when they are required to collect information from within the company, for example, in the case of an audit, discovery in litigation, etc. Discovery may refer to the collection of information stored in electronic form, for example, electronic discovery (eDiscovery) in the context of litigation. Discovery does not necessarily include the search and collection of email. Accordingly, there are numerous problems for conventional data collection systems. Some problems are listed below.

First, a company may face a serious set of problems if the company is obliged to discover and collect relevant information across its whole product range, for all versions and for all the years it has been producing the products. The problems here include those related to the complexity of getting all products (past and present), sheer volume over the years (and with the possibility of a large number of hardware platforms involved), and actually locating what is still available from the early years.

There may have been many products (or more accurately products and product groups) released over the years. Types of products may include, such as, e.g., but not limited to, current products, products that are in a "maintenance" mode (which may still have significant customer base), and "historical" or "dead" products, etc. Current products may include products that are currently being developed. Maintenance mode products may include products that are no longer being developed but are still being sold. Historical or dead products may include products which are no longer sold or no longer available.

Current products and maintenance mode products may also contain numerous third party products, and in some cases a complex web of "internal" products which product groups often share. To add to this complexity of data identification and collection, major products may also have spin-off products.

Second, most companies run their daily business based on a "Living" environment, an environment where data may be constantly changing. Therefore, for many companies it is impractical to shut down systems while all the data within the systems is collected. This may be a significant issue if data has to be collected with an imposed deadline and may affect a company's FTO, becoming a significant burden on the company.

Third, companies, especially those involved in the Computer Software industry, often use Source Control Systems (also known as Revision Control Systems and Version Control Systems) to develop their products. Source Control Systems permit changes in data to be tracked over time. Changes are usually identified by a number or letter code, termed the "revision number," "revision level," or simply "revision." For example, an initial set of files is "revision 1." When the first change is made, the resulting set is "revision 2," and so on. Each revision is associated with a timestamp and the person making the change. Revisions can be compared, restored, and with some types of files, merged.

Over time these Source Control Systems are often replaced by new development products for other Source Control Systems. In addition, acquired companies may bring diverse development technology, often resulting in a mix of Source Control Systems in use by different groups within the same company. Additionally, "older" products that are still in the market but no longer being developed may be left in their original Source Control Systems. Identifying and extracting information in a complex environment in a standardized form can often be a heavy and costly business when dealing with multiple Source Control Systems.

Fourth, more and more companies have expanded and diversified the locations where company data is stored (e.g., through mergers or acquisitions, tax incentives, development costs, etc.). It is no longer the case that only large global companies have multiple development sites spread over different country locations. This geographical diversity may provide a considerable obstacle in obtaining the data within a limited timeframe.

Fifth, within most companies there are multiple organizations, such as, Product Development/Manufacture, Quality Assurance, Marketing & Sales, Financial & Controlling, Professional Services, Technical Alliances (Third Party), etc. The presence of multiple organizations introduces a whole set of problems in a data collection process. Information from some groups (e.g., Financial) may be sensitive and highly confidential, and some groups (e.g., Marketing) tend not to maintain older information. Additionally, different groups may have different methods and structures for storing their own data.

Sixth, occasionally there is the need to identify and collect "Historical" information. This could be information about products that are "dead" or in a "maintenance" mode, but also information on older product versions of current products that go back many years. Some documentation may be in a format no longer used within the company and the tools that support the format may no longer be available. Also, there may possibly only be hardcopy versions of documentation available. Another problem is that in some cases the person responsible and knowledgeable for documentation may no longer be with the company, and over time and with possible office changes, a hardcopy may not be retained or lost.

Seventh, in a company there is always reorganization, staff turnover, relocations, etc. These changes may provide a significant stumbling block in locating relevant information in any collection process, especially if the "completeness" of the data collection is an issue.

Eighth, there are some issues and problems that may be specific to companies that employ the use of Mainframes in their data storage. Particularly, these types of machines usually use Extended Binary Coded Decimal Interchange Code (EBCDIC) encoding rather than American Standard Code for Information Interchange (ASCII). In addition, product development in the past on such machines revolved around specialized environments rather than conventional Source Control Systems, making data extraction difficult.

Ninth, almost all companies have some form of back-up/recovery system for their data. The problem is back-up/recovery systems can often be extremely large, the vast majority of the data being duplicates and as such irrelevant to most discovery activities. Additionally, there is a significant problem with cost-effectively searching such back-ups.

Tenth, in any company there is a significant amount of sensitive and confidential information (e.g. product source, financial details, strategy and future plans). If it is necessary to discover and collect this information then there is the problem of how to identify, separate, and secure this data during the lifecycle the collection. Another problem is identifying who will have what kind of access to the data. A further problem is how the data will be secured long term or securely destroyed once it is no longer needed.

Specialized data collection solutions in the market concentrate on searching all available data with sophisticated indexing and search algorithms.

One such solution is provided by Symantec Corporation and is described in Discovery Accelerator 8—Effective Searching, published in May 2010 and authored by Logan Sutterfield. The document offers an approach which collects information from specific repositories into a homogenized archive solution called an Enterprise Vault. This solution tailors an archiving method for common sources inside an organization (e-mail servers, collaborative editing servers, file archives, etc.), avoiding issues such as replication. All information is then stored and indexed in the Enterprise Vault. A tool called Discovery Accelerator then proceeds to search these indexes and retrieves the required documents based on the search parameters.

Once defined, the process runs automatically, collecting all data and storing it securely. However, since the amounts of collected data are huge in the typical enterprise scenario, a lot of non-relevant information is collected, and is sorted out by precise parameter searching. The time of relevant data selection is at the time of the discovery. Because the sorting is highly dependent on the accuracy of the search criteria, there is a high risk of either failing to find all relevant information or of finding a mix of relevant and irrelevant information or both. In any event, it may be difficult to be assured that the returned data is in any way complete. Such an approach may be challenged either in the aspect of returning all relevant data (ex., its completeness) or that it has been used to hide data (e.g., by choice of indexing). Also, this solution does not include an approach to manage data stored in EBCDIC format. In addition, the system is expensive in the set-up and maintenance complex (e.g., setting up and maintaining the indices).

Autonomy Corporation describes another solution in the document "Next Generation Archiving—White Paper," using customized search mechanisms based on their IDOL (Intelligent Data Operating Layer) platform, which is claimed to understand over 1000 different file formats. This platform creates conceptual and contextual relationships between the stored data. Using their Enterprise Archive Solution (EAS), files are stored in a centralized repository which handles e-Mail and shared network folders separately. All stored files and e-Mails are indexed according to IDOL's methods and are searchable afterwards. However, this approach also suffers from the same issues and problems as the Symantec solution.

These types of solutions described usually come with service level agreements, indicating their complexity. The solutions also have to be maintained over the years, again at very high cost. As a result, the cost-effectiveness of this approach and these mechanisms is one of the key reasons for avoiding them. In addition, these solutions, when implemented as offered, could very well disclose information which, while not relevant to the discovery itself, might be extremely sensitive.

Accordingly, there is a need for a system and method that can overcome the disadvantages of the previous systems and methods.

SUMMARY OF THE INVENTION

In an illustrative embodiment of the present invention, a method and computer readable medium is disclosed.

A method for collecting data comprises receiving data across heterogeneous networks at a point of release of the data; receiving identification information identifying the data; storing the data in an archive based on the identification information; receiving a request from a secure environment to access the stored data from the archive; and providing the stored data from the archive to the secure environment.

A computer-implemented system for collecting data, the system comprises a central processing unit (CPU) having memory storing CPU-executable instructions; and the CPU to perform the following according to the instructions: receiving data across heterogeneous networks at a point of release of the data; receiving identification information identifying the data; storing the data in an archive based on the identification information; receiving a request from a secure environment to access the stored data from the archive; and providing the stored data from the archive to the secure environment.

A computer readable medium storing computer-executable instructions for causing a computer to perform the steps of receiving a notification of an incoming delivery; receiving the incoming delivery at a point of release; archiving the delivery based on the notification; receiving a request to access the archived delivery from a user device; retrieving the archived delivery based on the request; and providing the archived delivery to the user device.

Further features and advantages of the invention, as well as the structure and operation of various exemplary embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Figure 1:
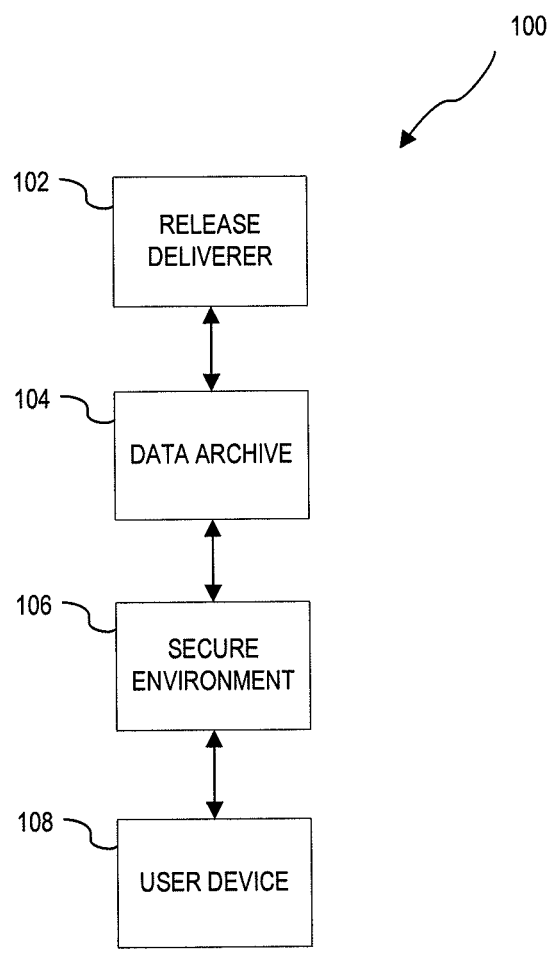
FIG. 1 illustrates an exemplary block diagram of a data collection system according to an exemplary embodiment of the present invention.

According to an exemplary embodiment, the data collection system may overcome the disadvantages of conventional data collection to significantly reduce the complexity of the task of finding and collecting information. The system may thus reduce the burden on the company to a manageable and affordable level while allowing the company to maintain its "Freedom to Operate" (FTO). The system may approach data collection by identifying and collecting data at a point of release of the data. The point of release may be the point of entry of the data into the public domain. The data collected may be relevant data that may be needed for discovery. By taking this approach, the system may significantly reduce the burden on a company at the time the information needs to be discovered and collected.

Searching and collecting data at the point of discovery may introduce undue burden for a company due to time constraints. Rather than searching at the point of discovery, the system may collect relevant product data throughout multiple geographical locations, different production environments, development teams, and different organizations within the company (e.g. Marketing, Finance, etc.), at the point of release of the data. Further, the system may be flexible enough to supplement this data with information that can only be determined at the time of discovery.

The vast majority of relevant data needed in most litigation discovery type activities comes together at the time of release of data into the public domain. Collecting relevant and related data at the point of release in a centralized and certified archive system may provide a complete and accurate copy of the relevant data, avoiding initial deadline pressure during litigation.

Collecting data at the point of release has many advantages. When a product is declared ready to be released, all data related to the product is up to date. Files containing information such as product documentation, product requirements, design documents, meeting minutes, strategy development, and product source code, are all available in their frozen versions at the time the product is ready for release. As the individuals delivering this data have been working with the product for a considerable amount of time, the individuals remember the storage locations and files involved much clearer at the time of release, rather than some months or years later when the product is no longer relevant to the developing team and associated parties within the company.

The point of release may also specify a location along with the point in time where all this information comes together. Products typically do not leave a company directly from the development teams, but are first delivered to a control entity, for example, a Project Management Office (PMO). As a PMO checks for completion of projects, all available and relevant information regarding a product may be available when the PMO receives a project ready for release. Thus, establishing the PMO as the location of a point of release to control the collection of relevant data may be appropriate.

Further, the system may provide a cost-effective solution that overcomes the disadvantages of the prior art, does not impact the FTO (Freedom to Operate) of a company, and secures sensitive data and the viewing thereof. The system may be user friendly, easy to set up, and easy to maintain. Thus, the system may be cost-effective for a company. Viewing and searching of the secured data may not require special tools to be installed by the user. In addition, the system may be flexible, for example, allowing for the additional collection of relevant data (e.g. changing Marketing material and websites) as data changes are released into the public domain over the lifespan of the product. The system may also allow for the collection and secure storage of relevant data in discovery situations, which by their very nature may involve highly sensitive data. Such data, which may include current financial reports and current customer reports, may possibly only be generated and collected at the point of discovery. Accordingly, the system may collect and store "yet to be released" but relevant data at the point of discovery without undue burden.

According, the system may provide for the collection of data in a heterogeneous network, long term secure storage of the data, and secure transfer of the data to an environment that may be secure and controlled for the purpose of controlled and secure selected viewing of all or parts of the data. The data stored may include core data of interest as well as any data that is associated with the core data. The core data and associated data may be stored. To do so, the system may identify and collect associated data at the point of release of all or part of the data. Further, the system may provide secure and controlled transfer of the data to a permanent and secure media. Lastly, the system may provide secure transfer of all or parts of the data from the media to a controlled and secure environment suitably constructed to provide for secure viewing of all or parts of the data under the control of the owner of the data.

FIG. 1 illustrates an exemplary block diagram of a data collection system 100 according to an exemplary embodiment of the present invention. The system 100 may include a release deliverer 102. The release deliverer 102 may be a release delivery mechanism at a point of release and may receive data that is released to the public by the system 100.

The release deliverer 102 may be in communication with a data archive 104. The data archive 104 may receive data from the release deliverer 102 and store the data on an electronic medium of the data archive 104. The data archive 104 may be a certified archive which prevents further changes and keeps a timestamp stating at which time the information was stored. The certified archive may prevent further changes to the stored data. Thus, the stored data may be effectively frozen in time and may be an exact match of the released information, guaranteeing integrity of the data.

The data archive 104 may further be in communication with an environment 106. The environment 106 may receive the data stored by the data archive 104. The environment 106 may provide a secure environment where stored data may be aggregated and presented for consumption by users. The secure environment 106 may further be in communication with a user device 108. When information relevant to, for example, a litigation discovery request, is required, the data may be securely transferred from the data archive 104 to the secure environment 106. The information on the secure environment 106 may then be accessed through the user device 108 over a secure network connection, e.g., corporate or internet, by an authorized user. Secure reviewing and searching for information may occur locally on the secure environment as the secure environment may possibly only allow virtualized desktop connections, such as, e.g., but not limited to, a remote desktop protocol (RDP) connection. Accordingly, access is securely controlled. Additionally, bulk data transfers and the risk that the data will be stolen are avoided.

In an exemplary embodiment, the release deliverer 102, data archive 104, secure environment 106, and user device 108 may be at least one of directly and indirectly in communication with one another via a network (not shown).

Figure 2:
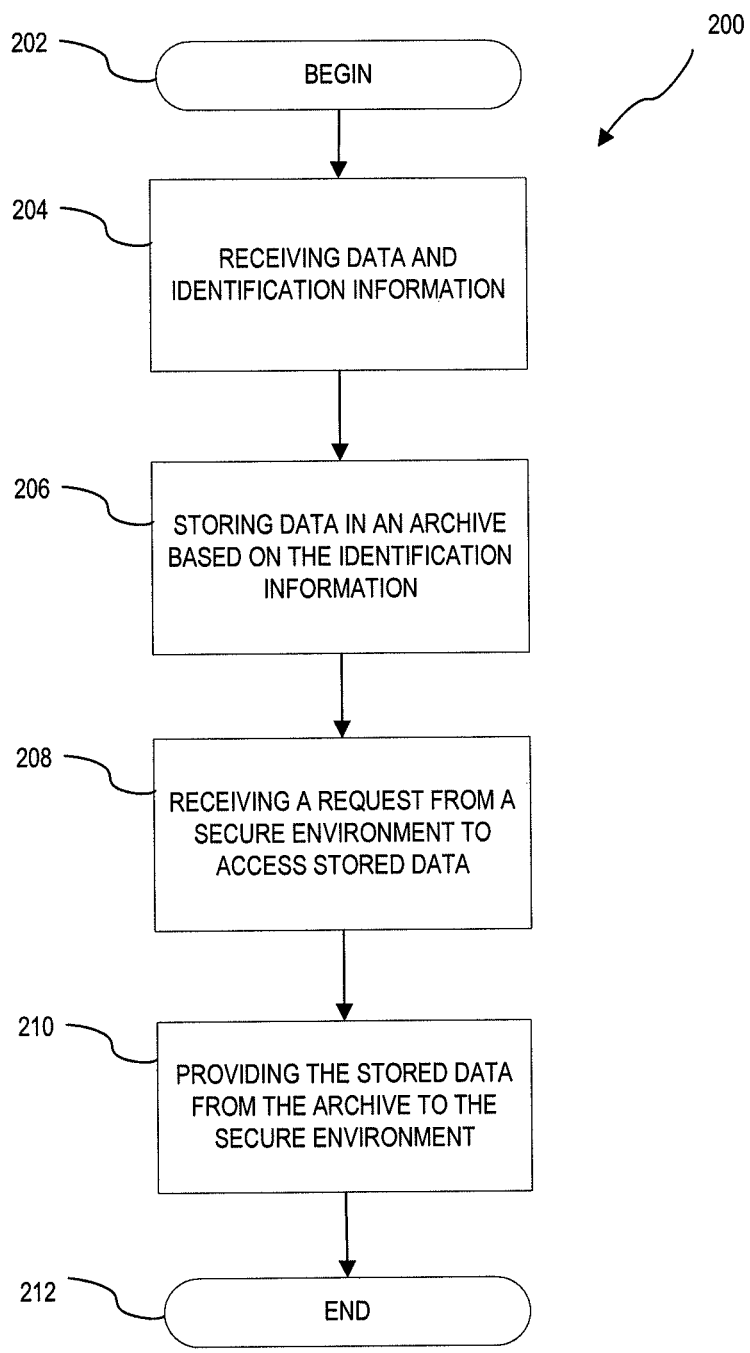
FIG. 2 illustrates an exemplary flowchart for a process of collecting data according to an exemplary embodiment of the present invention.

FIG. 2 illustrates an exemplary flowchart 200 for a process of collecting data according to an exemplary embodiment of the present invention. Flowchart 200 starts 202 with receiving data at a point of release of the data and identification information identifying the data 204. For example, the data received may be the relevant data of the product being released. The identification information may be information describing the data, for example, product version, personnel involved in product development, release date of product, product details, etc.

Figure 9:
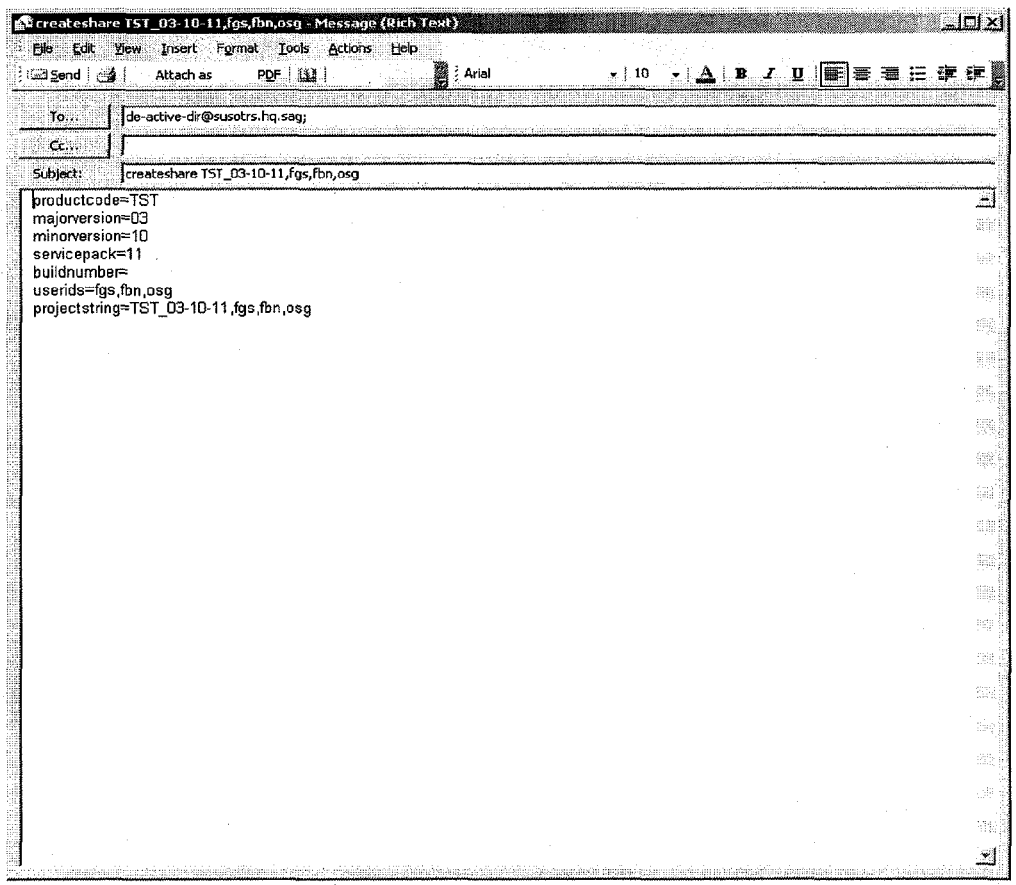
FIG. 9 illustrates an exemplary set of identification data, including the online form which collects the data and the output from that online form.

The received data may then be stored in an archive based on the identification information 206. The identification information may determine how the data is stored. For example, the format of or location in which the data is stored may be dependent on the identification information. A typical example for this identification information is shown in FIG. 9. The identification data may include a product code, version number, service pack number and other information regarding a product being released. The identification information may be used to generate metadata associated with the data and stored with the data.

After the data is stored in an archive, a request from a secure environment to access the stored data from the archive may be received 208. The secure environment may request the archive provide archived data relevant to any query. For example, the request may be for data related to a litigation, a particular product, an employee, or a period of time.

In response to the request, the data stored in the data archive may then be provided from the archive to the secure environment 210.

Figure 3:
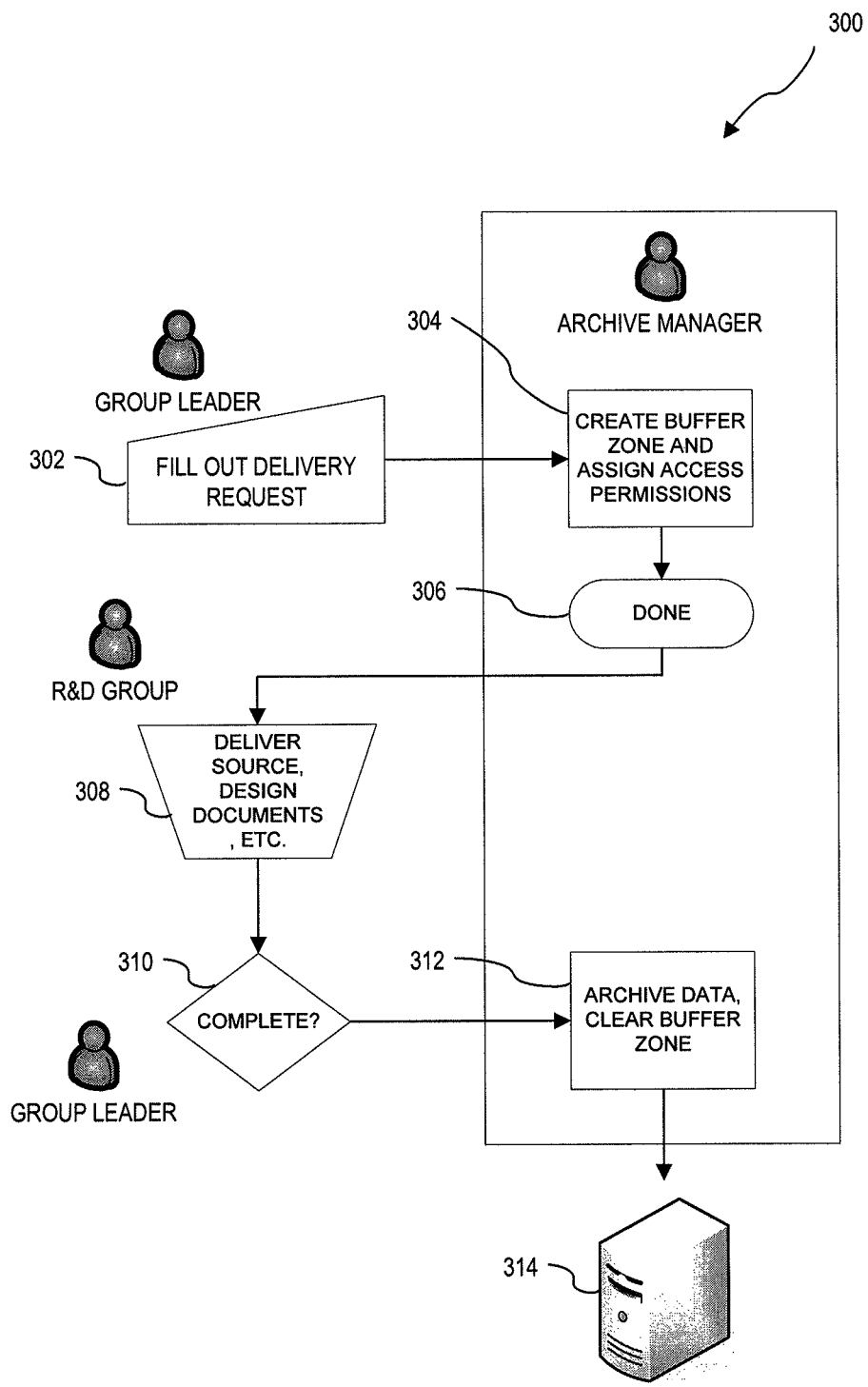
FIG. 3 illustrates an exemplary flow diagram of storing data in an archive according to an exemplary embodiment of the present invention.

FIG. 3 illustrates an exemplary flow diagram of storing data in an archive according to an exemplary embodiment of the present invention. To ensure a complete and comfortable delivery of project data, a delivering user may fill out a delivery request using an online form to notify a managing user of incoming data for a product 302. A delivering user may be a product manager. A managing user may be an administrator of the data archive (Archive Manager).

The notification may state the product's version and the users involved in the delivery. Also, the notification may be used to create a log and audit trail. This notification may be sent electronically, for example, via online form as depicted on FIG. 9. Upon receipt of the notification, the managing user may create a shared network folder for delivery and set the permissions for the folder, for example by means of running a script with the parameters included in the form 304. The creation of a shared network drive may also be fully automated based on the receipt of the notification.

The delivering user may then be notified that the project data may be put into the shared network folder created by the managing user 306. The delivering user may put project data in the folder and may also notify other members of a project, for example, members of a research and development group, to put project data in the shared network folder 308. Once the project data is put in the shared network folder, the delivering user may then contact the administrator and request the data be archived 310.

The administrator may then collect the delivered data into a legally-certified archive system 314 and remove the data from the shared folder 312. In an embodiment, the archiving system 314 may be the Autonomy Zantaz e-mail and file archiving system providing tamper-proof file storage and a timestamp log for every file archived in the system. However, other archive systems 314 may also be used by the system. The identification data may be used to selectively retrieve parts of the stored data.

In addition to collecting relevant data at the point of release, the system may allow for the collection of relevant data (e.g. Marketing docs, ppts, training podcasts and Web content etc.) that while related to a product release, can be updated and modified during a product's lifespan. This data may be collected at its point of release into the public domain and there may be no constraint to use the same certified data archive. In fact, in one embodiment a different but similarly certified data archive may be used to provide back-up and restore capability for daily use. This capability may be especially beneficial for some Marketing information and a Marketing website which may have data which changes across time.

Figure 4:
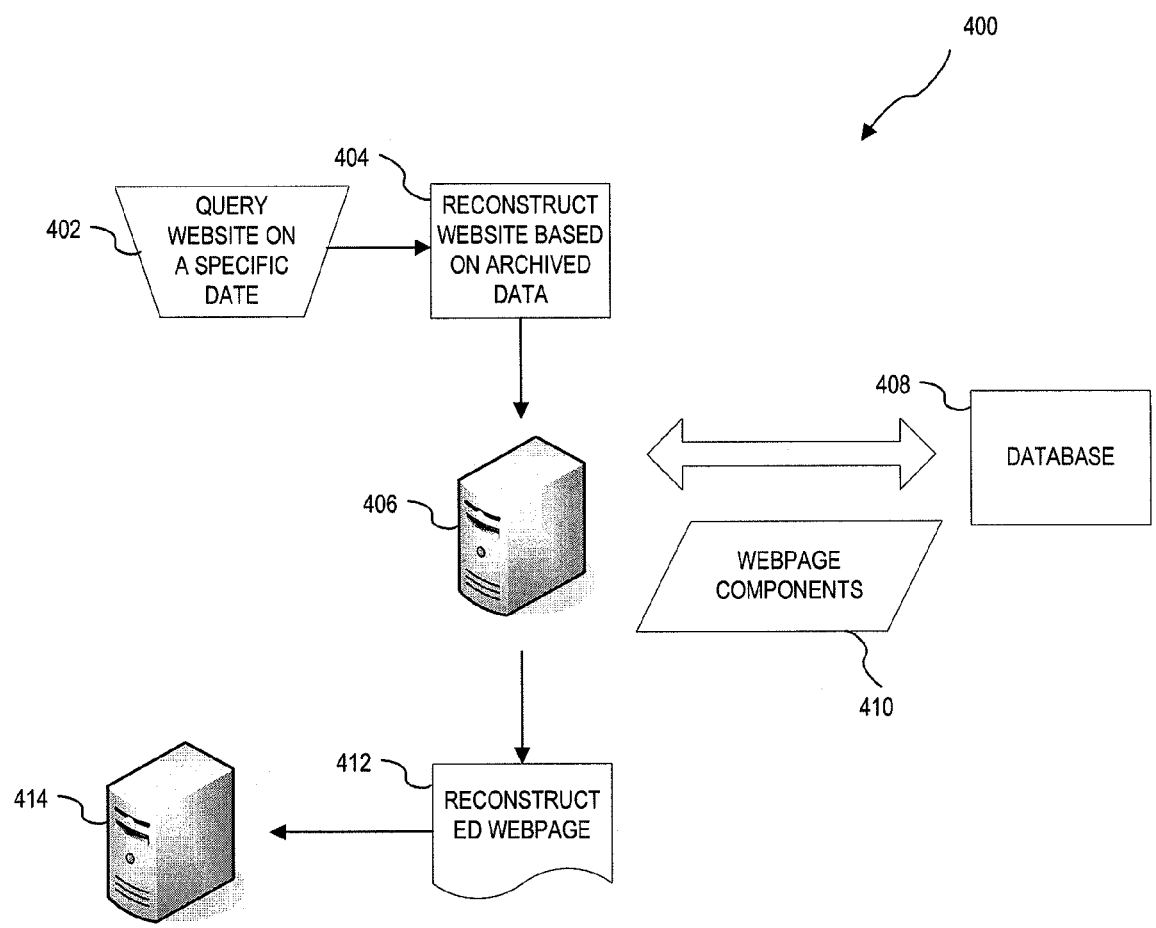
FIG. 4 illustrates an exemplary flow diagram of storing tracked changes in a website according to an exemplary embodiment of the present invention.

FIG. 4 illustrates an exemplary flow diagram of storing tracked changes in a website according to an exemplary embodiment of the present invention. In one embodiment, the data may be stored in a Tridion Online Content Management System. The Tridion system 406 may store all published (therefore released) information as components 410 needed to build a webpage together along with a blueprint on how to build the website. The Tridion System 406 may then create the webpage that is published on the web servers based on the components and blueprint. In order to archive all versions of all created web sites, the system stores a website as components 410 at the point of the release and tracks all changes made after the first release. By querying the database 408 with a location and a date, the database 408 can re-create the webpage's blueprint as it was on any date after the components 410 are stored, and forward the blueprint to the Tridion System 406 to create a copy of the website based on the components 410 and blueprint. This copy can then easily be stored on the secure environment for secure delivery to a user.

Figure 5:
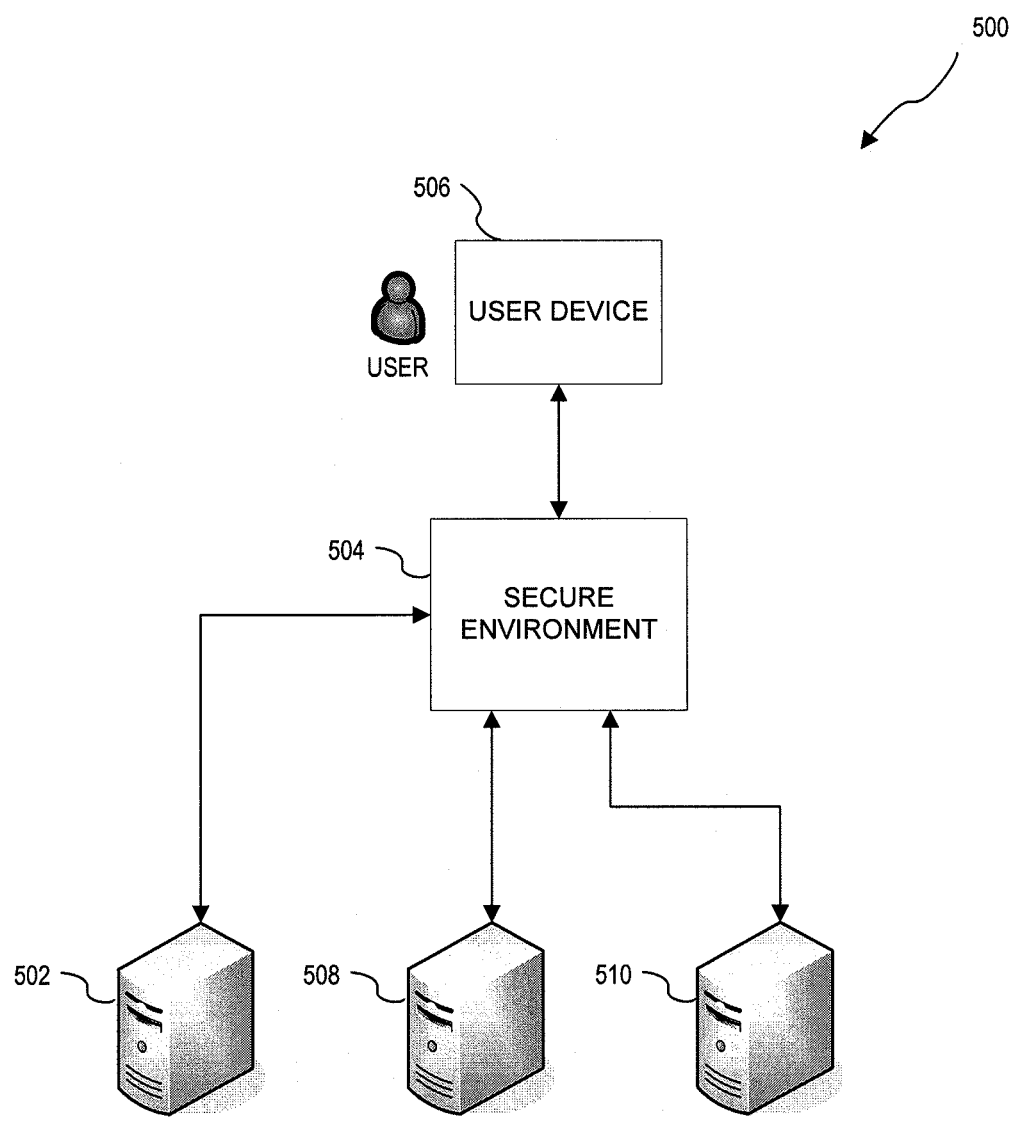
FIG. 5 illustrates an exemplary flow diagram of data between an archive and a secure environment of the data collection system according to an exemplary embodiment of the present invention.

FIG. 5 illustrates an exemplary flow diagram of data between an archive and a secure environment of the data collection system according to an exemplary embodiment of the present invention;

At the time of a discovery request, the company may determine which relevant data will be required (e.g., for which products and for which time period) and the system may assemble the data in a secure manner on a secure environment 504. While the vast majority of the most important and relevant data may come from a certified data archive 502, the system may be flexible and allow this data to be supplemented by data from other sources when necessary (e.g., production of current financial reports and customer details that can only be generated at the time of discovery) 508 and 510. Accordingly, the system may not only reduce the burden on the company and its FTO, but allow for the discovery to be as complete as due diligence allows, without an increased burden under time constraint stress.

The data archive may be in communication with a secure environment 504. The data may be loaded onto the secure environment either by pushing or pulling the files from data sources (back-up servers, archive, web servers, etc.). For pulling, an authorized internal employee (other than the server administrator) may use a user device 506 in communication with the secure environment 504 to pull the information manually from these sources 502, 508, and 510. This may be done via keyword searching, date searching and the like. Pushing may require access credentials to the system for the data source or the source's administrator, but may create security risks. Once the data is stored on the secure environment 504, the data may be encrypted, searched, and viewed.

The data may be at least one of encrypted or stored in an encrypted container at the point of collection, at the point of transfer to the data archive 502, at the point of transfer from the archive 502 to the secure environment 504, or at the point of receipt in the secure environment 504. Similarly, the data may be converted to a readable and/or searchable form by the use of adapters, tools or products capable of conversion. Conversion may be done at the time of secure transfer to a shared network folder, at the time of secure transfer from the secure network folder to the data archive 502, at the time of transfer from the data archive 502 to the secure environment 504, or at the time of providing the data to a user device.

The secure environment 504 may be a virtualized server running on a cluster involving a large number of administrators with access to different system layers. Access to the delivery system may remain tightly controlled. Accordingly, the release deliverer may be a stand-alone server.

The secure environment 504 may grant access only to a limited number of locally defined users and administrators. Therefore, the risk of accepting access from users who have been authenticated by an instance external to the system, which could be managed by an unknown administrator, may be eliminated. Administrators may be restricted to accessing the system through a corporate network and never through a wide area network.

Figure 6:
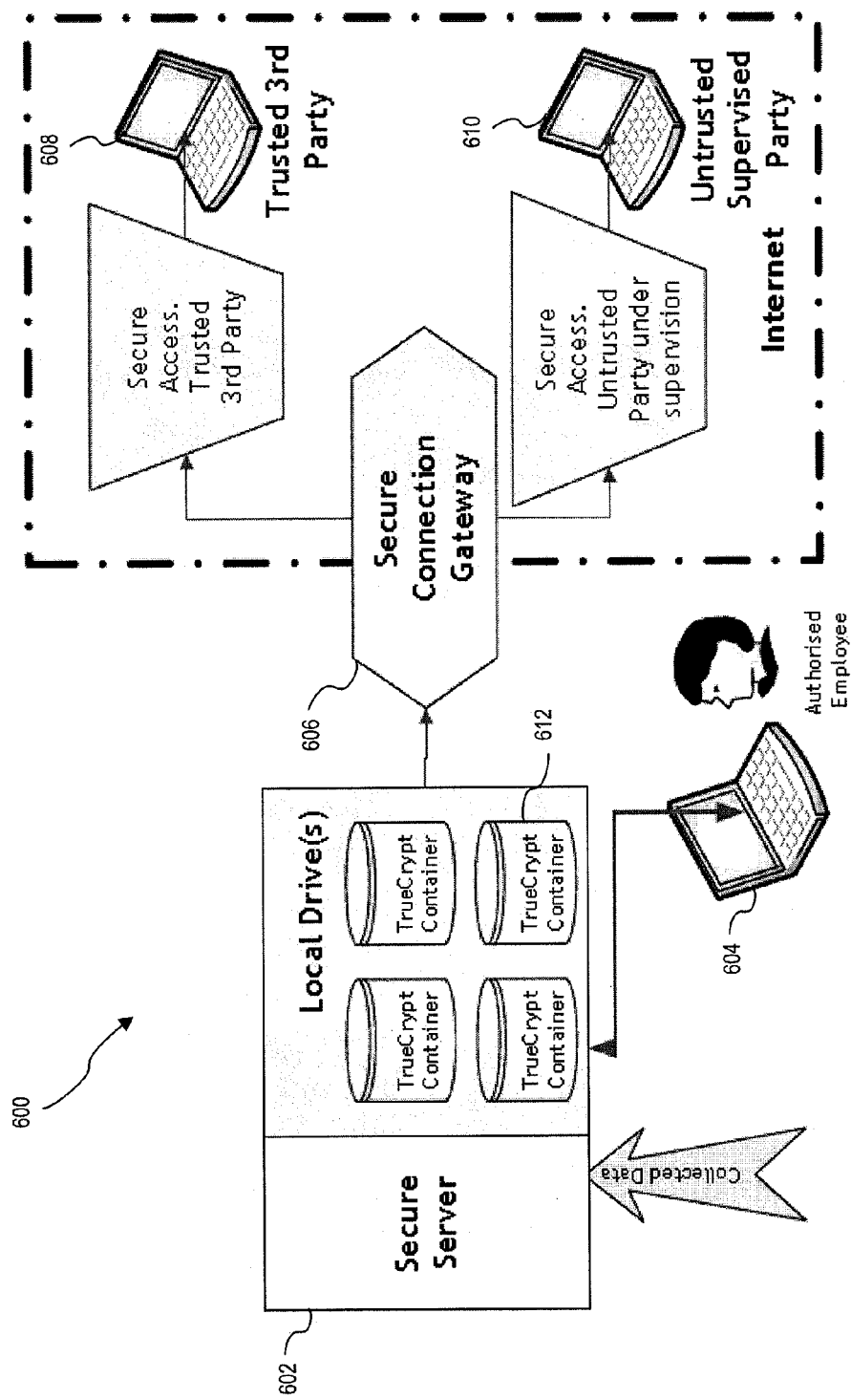
FIG. 6 illustrates an exemplary flow diagram of data between the secure environment and user devices according to an exemplary embodiment of the present invention.

FIG. 6 illustrates an exemplary diagram 600 of data communication between the secure environment 602 and user devices 604, 608, and 610, according to an exemplary embodiment of the present invention. The diagram 600 shows a secure environment 602 in communication with an internal user 604, for example, an authorized employee. The secure environment 602 is also in communication with a gateway 606. The gateway 606 is further in communication with a trusted external user 608, for example, a trusted third party, and an untrusted external user 610, for example, an untrusted supervised party.

Independent from internal or external access, the system enforces security on both connection and data storage layers. Access to the secure environment 602 may be controlled using access credentials such as user name and password, which may be subject to conditions such that the access credentials are not easy to break. Successfully connecting to the secure environment 602 may possibly only allow access through a remote desktop protocol (RDP) connection, for example, RDP 7.0, to a repository for strongly encrypted data containers 612. A different set of passwords may be required to mount and read these encrypted containers 612.

The internal user 604 may connect to the secure environment 602 by opening a remote desktop connection client and specify connecting to the secure environment's address. The secure environment 602 may then authenticate the user name and password of the internal user 604. After authentication, the secure environment 602 may provide the user 604 with a virtualized desktop view from the secure environment 602. The internal user 604 may then specify an encryption password to access the contents of encrypted storage 612 of the secure environment 602. After the user specifies the password, the secure environment 602 may then mount the encrypted containers 612 for access by the internal user 604. The internal user 604 may then have complete on-demand access to relevant collected data.

The secure environment 602 may also provide data to external users 608 and 610. The external network connection path may be able to connect a secure environment 602 located in a secured and fully controlled location inside the corporate network to a client in a wide area network through the Internet. To guarantee connectivity to the external client, the connection path may be accessible via standard network ports, such as, e.g., but not limited to, port 443 for Secure Socket Layer/Transport Layer Security (SSL/TLS), which are usually open per default in firewalls. Using such ports may avoid reconfiguration of the client's firewall, allowing access from a standard Internet connection. Alternatively, a Virtual Private Network or other method may be used.

To ensure that this set-up only permits connections to the secure environment 602 from trusted communication partners, a secure connection gateway 606 may be implemented between the firewall of the company hosting the secure environment and the secure environment. The gateway 606 may evaluate the traffic that comes in through the firewall over the standard ports, check for authenticity, and reroute this traffic onto the system's secure environment 602. This gateway 606 may be seen as the first of several security defense layers.

A trusted external user 608 may open an encrypted connection to the gateway 604, which then enables a remote desktop connection to the secure environment 602. The secure environment 602 may then proceed to authenticate the user credentials to allow local access. The trusted external user 608 may now, as the internal user, enter the encrypted storage password to have complete and on-demand access to the containers 612. Trusted external users 608 may also mount the encrypted containers via script, but be granted read-only permissions. One or more additional working containers with read and write permissions may also be mounted for the external user's convenience. The working container may permit document selection, secure working space, etc.

A non-trusted external user 610 under trusted supervision connecting from a wide area network may also access and use the system in the same manner as the trusted external user 608, but using separate access credentials and with restricted permissions. The validity of the access credentials for the non-trusted external user 610 may be limited to a specific timeframe and an encrypted working container may not be provided for the non-trusted external user 610.

Besides limiting access to the secure environment 602, transferring screen contents of the secure environment 602 over a remote desktop connection instead of the entire files may offer a further security advantage by limiting the transfer of data to users. Further, in the event of the connection's encryption being cracked during the specified access time windows, only the screens viewed at a given time would be exposed.

Restricted access permissions may allow for selected viewing, searching and identification and selection of relevant data but restrict data transfer out of the system. Additionally, if needed, selected data once identified by a user may be packaged and securely transmitted separately to the user.

Figure 7:
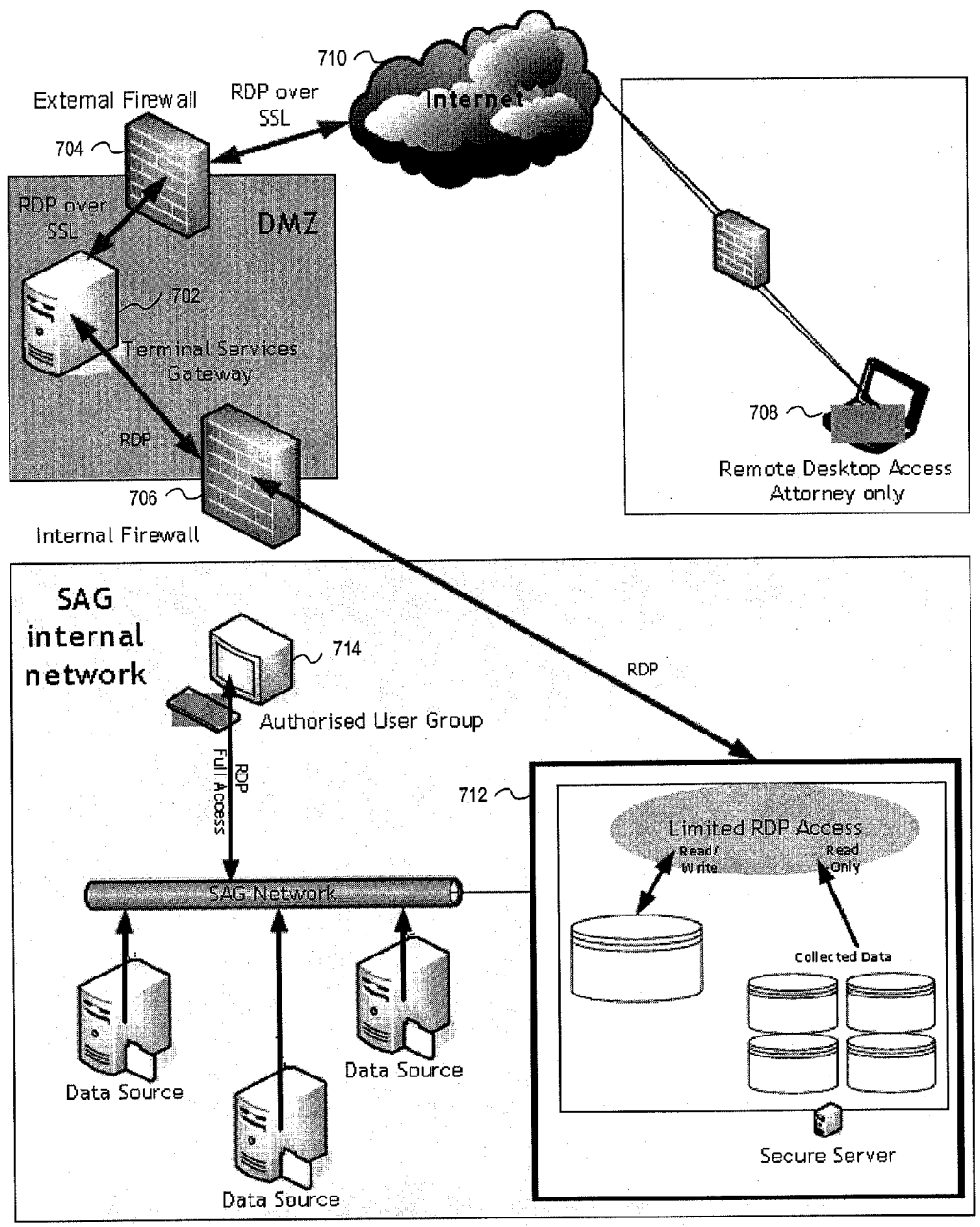
FIG. 7 illustrates an exemplary detailed flow diagram of the use of remote desktop protocol in the data collection system according to an exemplary embodiment of the present invention.

FIG. 7 illustrates an exemplary diagram of the usage of remote desktop protocol in the data collection system according to an exemplary embodiment of the present invention. The Secure Connection Gateway 702 may include a lean virtual machine running Terminal Services Gateway on Windows 2008 Server R2. The Secure Connection Gateway 702 may lie in the company's demilitarized zone (DMZ), between both an internal 706 and an external 704 firewall. The Secure Connection Gateway 702 may establish and maintain a Remote Procedure Call/Hypertext Transfer Protocol Secure (RPC/HTTPS) link with an external user device 708 via the Internet, extract the encapsulated Remote Desktop Protocol (RDP) data, and redirect the RDP data to the secure environment behind the internal firewall 702.

For connections from within inside the corporate network, the use of an authentication instance such as the Secure Connection Gateway 702 may be omitted. User and administrator authentication may be directly handled by the secure environment 712. Access to the secure environment 712 may be handled through locally defined users and administrators detached from an external authentication authority, such as, e.g., by an Active Directory service. Only these access credentials may provide access to the secure environment 712. Accordingly, the secure environment 712 may possibly only be reached internally by designated administrators and selected groups 714.

To handle an unauthorized network packet capture inside the corporate network, the secure environment 712 may communicate with other components inside the network. Communication may be handled via an encrypted remote desktop connection, for example RDP 7.0, which encrypts the connection, for example, using RC4. An encrypted secure connection provides effective access control on both connection and data storage layers. The secure environment 712 may also limit write access permissions for an external user logging in over the Internet.

Searching and viewing the data may be done without any special software, but may also be done with specialized search and viewing software. For example, a secure environment may load legacy data (i.e., data that exists prior to use of the system) as is (e.g., from a Source Control database) with the necessary viewing and search tools that might be needed for this specific data on the secure environment 712, rather than have to convert and recollect data. Accordingly, as specialized tools may be provided in the virtualized desktop of the secure environment 712, specialized tools may not need to be installed on the user device 708.

Once data has been securely delivered to the secure environment 712 and all permissions and safeguards are in place for secure and restricted access, the system may permit various viewing and search scenarios. Example viewing scenarios include, for example, data reviewing by a restricted group of trusted internal employees, data reviewing by a trusted external partner over a wide area network, data reviewing by a non-trusted party (under supervision by or through a trusted employee or trusted external partner located in a controlled and secure location) over a wide area network.

Security may be further enhanced by introducing controls, for example, limiting access from specific locations (e.g. specific IP address) and/or time. All access may be logged and audited. The secure environment may also be located in a secure location and only physically powered on and available when required.

Figure 8:
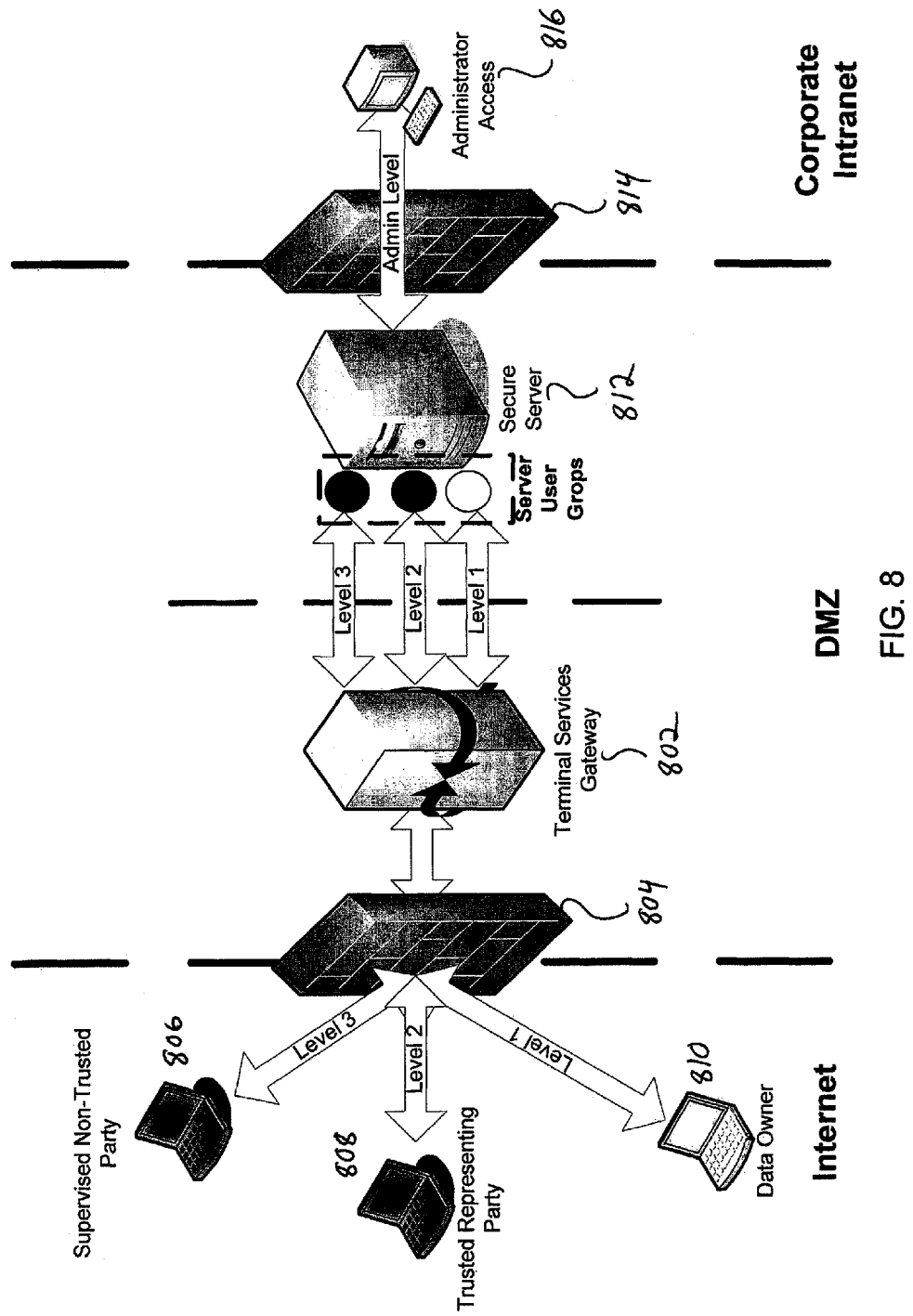
FIG. 8 illustrates an exemplary access level mechanism which limits the user's permissions to perform any actions inside the secure environment by enforcing remote desktop protocol rules on the physical network interface controllers.

FIG. 8 illustrates an exemplary access level mechanism. A secure connection gateway, in the preferred embodiment a terminal services gateway 802 located behind a first firewall 804, may receive connections from devices 806, 808, 810 across the Internet. Access to the server 812 may occur through the terminal services gateway 8020, distinguishing different user permissions according to the log-in credentials used. For example, different access levels may be provided. In this example three access levels are provided: access levels for non-trusted parties, data owners and trusted parties. The gateway 802 may then route the user 806, 808, 810 to a respective network interface controller port on the server 812, which may enforce Remote Desktop Protocol rules according to the user's access level. The server 812 may be located between firewalls 804 and 814, protecting the server 812 from both sides of the network. Users logging on to the gateway 802 using a determined access level may not access the server 812 using a different access level. The access levels via the network interface controller ports are independent of each other. The system administrator 816 may access the server over a network such as a corporate intranet bypassing the gateway 802.

Figure 10:
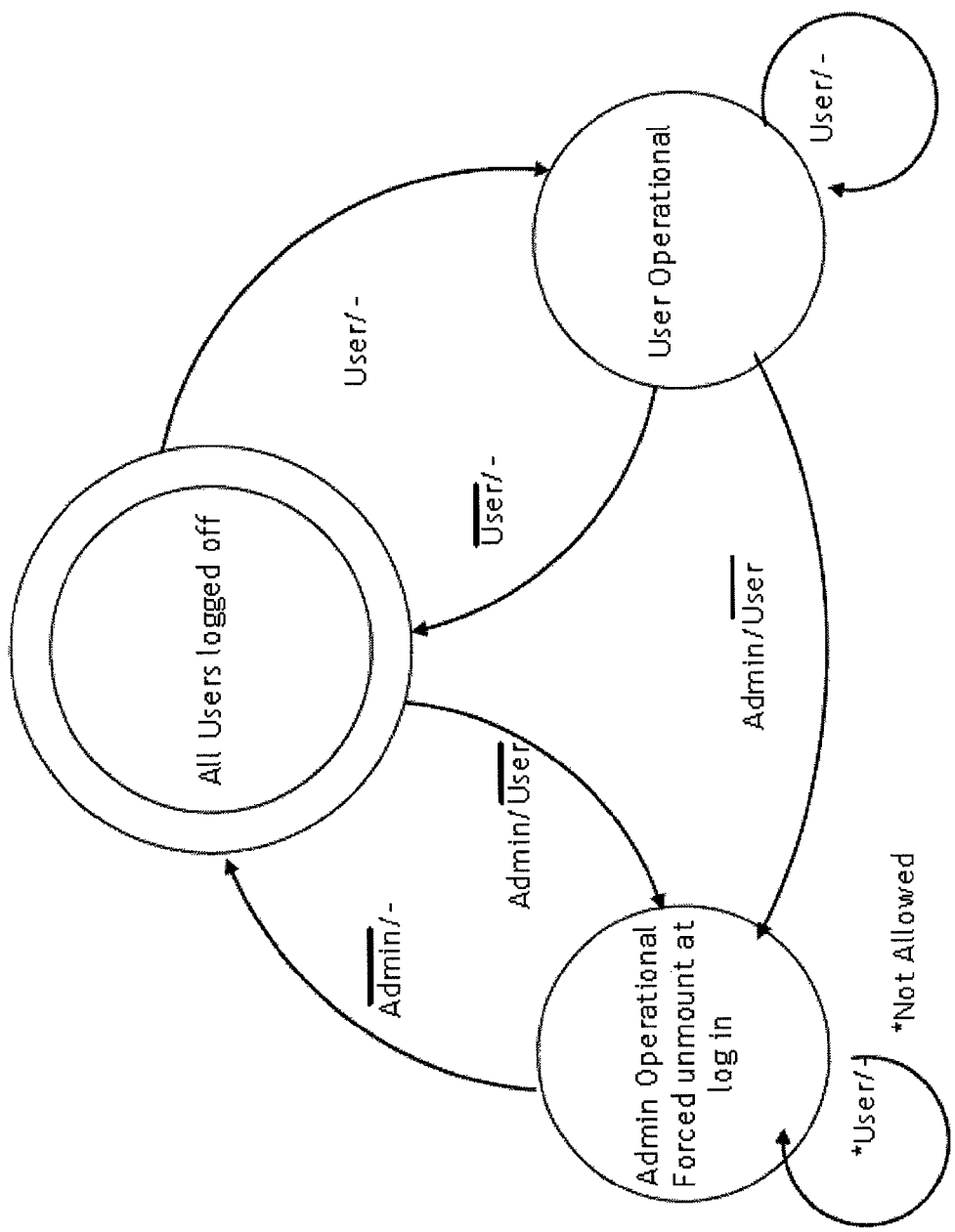
FIG. 10 illustrates an exemplary state diagram of a secure environment of the data collection system according to an exemplary embodiment of the present invention.

FIG. 10 illustrates an exemplary state diagram of a secure environment of the data collection system according to an exemplary embodiment of the present invention. The selected relevant collected data, sourced for example from the certified archive, may be transferred on demand to these encrypted containers in the secure environment system. Access to these containers may be limited authorized trusted users, not for the administrators since the administrators do not have the passwords to the containers. As an additional security measure, an administrator login may trigger a dismount of all encrypted containers and log out all other users automatically. User access may also be blocked while administrators are logged in. These measures may ensure that a container can never be opened while an administrator is logged on, controlling and limiting the list of authorized users with access to the data even further.

The system may also provide for a recovery mechanism in case of malfunction to restore functionality. The system may utilize the Zantaz archiving system, which is certified to store data preserving its integrity even in the event of hardware failure, therefore preserving the collected information. As all other data sources may also be backed up and may deliver the data on demand to the secure environment, the needed data may be recovered easily and in a timely fashion in case of malfunction.

As the information is available in the archive, it may not be necessary to back the information up again in the secure server. Further, not backing up this data may be advantageous as backing up the data may require a secure back up system as well. However, to ensure a fast restore in case of failure of the secure environment, the secure environment may be processed by an operating system that has been installed on a virtual machine running over the stand-alone server hardware. If any hardware or software problems occur, an image of the virtual machine may be loaded onto either the same or any other hardware with similar capabilities. Once the virtual machine has been restored, the data can be once again transferred from the certified archive or from other required sources. The system configuration for secure viewing remains safe in the stored virtual machine image, avoiding the need for a new setup configuration.

While the system may overcome the undue burden for a company in the event of litigation, the system may provide alternative or additional benefits. For example, the system may save considerable cost in the event of internal and/or external audits, and could be used in negotiations during a friendly merger/acquisition process since it may ensure privacy and secrecy (and limits and controls who has access)

while assets are being evaluated without the need to transfer the assets outside the company controlled environment.

A further feature of the system is that the system may be easily and cost effectively certified and audited on a regular basis. Each of the systems features, including the steps of determining the relevance and completeness of the data at the release point, the secure and certified archiving of data that matches exactly the data released to the public domain, the secure delivering to a secure store, and the ensuring restricted access, and the data's integrity throughout may be independently verified.

Further advantages of the system may include, but are not limited to collection of all available data (for example, R&D, marketing, etc.) relevant to the released product, distributed content is now turned into on-demand content, does not require changes to existing day-to-day data storage standard, significantly shortened response time once a discovery request (for example in litigation) is initiated, minimum impact on the Company's FTO, very cost-effective implementation, significantly lowered discovery costs, secure location for very sensitive information, certified data integrity, secure viewing and searching environment accessible through heterogeneous networks, and collection of data at the point of release automatically filters out irrelevant information at an early stage.

Figure 11:
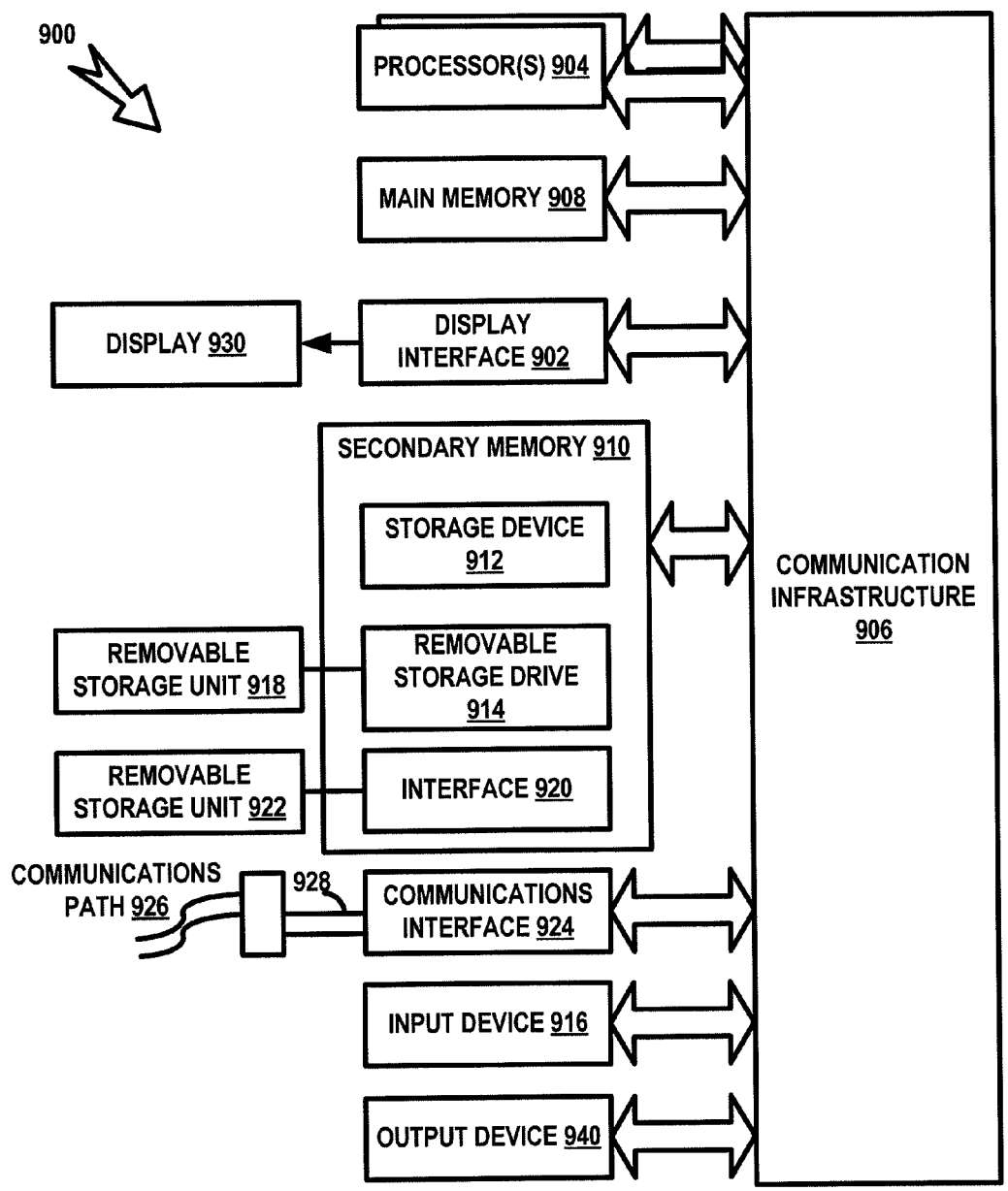
FIG. 11 illustrates a computer system that may be used in association with, in connection with, and/or in place of, but not limited to, any of the foregoing components and/or systems.

FIG. 11 depicts an exemplary embodiment of a computer system 900 that may be used in association with, in connection with, and/or in place of, e.g., but not limited to, any of the foregoing components and/or systems. The release deliverer, data archive, secure environment, and/or user device may be implemented with one or more computer systems 900.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 900 is shown in FIG. 11, depicting an exemplary embodiment of a block diagram of an exemplary computer system useful for implementing the present invention. Specifically, FIG. 11 illustrates an example computer 900, which in an exemplary embodiment may be, e.g., (but not limited to) a personal computer (PC) system running an operating system such as, e.g., (but not limited to) WIN-DOWS MOBILE™ for POCKET PC, or MICROSOFT® WINDOWS® NT/98/2000/XP/CE/7NISTA, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 11.

The computer system 900 may include one or more processors, such as, e.g., but not limited to, processor(s) 904. The processor(s) 904 may be connected to a communication infrastructure 906 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 900 may include a display interface 902 that may forward, e.g., but not limited to, graphics, text, and other data, etc., from the communication infrastructure 906 (or from a frame buffer, etc., not shown) for display on the display unit 930.

The computer system 900 may also include, e.g., but may not be limited to, a main memory 908, random access memory (RAM), and a secondary memory 910, etc. The secondary memory 910 may include, for example, (but may not be limited to) a hard disk drive 912 and/or a removable storage drive 914, representing a floppy diskette drive, a magnetic tape drive, an optical disk drive, a magneto-optical disk drive, a compact disk drive CD-ROM, a digital versatile disk (DVD), a write once read many (WORM) device, a flash memory device, etc. The removable storage drive 914 may, e.g., but not limited to, read from and/or write to a removable storage unit 918 in a well known manner. Removable storage unit 918, also called a program storage device or a computer program product, may represent, e.g., but not limited to, a floppy disk, a magnetic tape, an optical disk, a magneto-optical disk, a compact disk, a flash memory device, etc. which may be read from and written to by removable storage drive 914. As will be appreciated, the removable storage unit 918 may include a computer usable storage medium having stored therein computer software and/or data.

In alternative exemplary embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 922 and interfaces 920, which may allow software and data to be transferred from the removable storage unit 922 to computer system 900.

Computer 900 may also include an input device 916 such as, e.g., (but not limited to) a mouse or other pointing device such as a digitizer, a keyboard or other data entry device (none of which are labeled), and/or a touchscreen integrated with display 930, etc.

Computer 900 may also include output devices 940, such as, e.g., (but not limited to) display 930, and display interface 902. Computer 900 may include input/output (I/O) devices such as, e.g., (but not limited to) communications interface 924, cable 928 and communications path 926, etc. These devices may include, e.g., but not limited to, a network interface card, and modems (neither are labeled). Communications interface 924 may allow software and data to be transferred between computer system 900 and external devices. Examples of communications interface 924 may include, e.g., but may not be limited to, a modem, a network interface (such as, e.g., an Ethernet card), a communications port, a Personal Computer Memory Card International Association (PCMCIA) slot and card, a transceiver, a global positioning system receiver, etc. Software and data transferred via communications interface 924 may be in the form of signals 928 which may be electronic, electromagnetic, optical or other signals capable of being received by communications interface 924. These signals 928 may be provided to communications interface 924 via, e.g., but not limited to, a communications path 926 (e.g., but not limited to, a channel). This channel 926 may carry signals 928, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 914, a hard disk installed in hard disk drive and/or other storage device 912, etc. These computer program products may provide software to computer system 900. The invention may be directed to such computer program products.

Computer programs (also called computer control logic), may include object oriented computer programs, and may be stored in main memory 908 and/or the secondary memory 910 and/or removable storage drive 914, removable storage unit 918, removable storage unit 922, also called computer program products. Such computer programs, when executed, may enable the computer system 900 to perform the features of the present invention as discussed herein. In particular, the computer programs, when executed, may enable the processor or processors 904 to provide a method to control and/or manage operation of a positioning effect detection device according to an exemplary embodiment of the present invention. Accordingly, such computer programs may represent coordinators of the computer system 900.

In another exemplary embodiment, the invention may be directed to a computer program product comprising a computer readable medium having control logic (computer software) stored therein. The control logic, when executed by the processor 904, may cause the processor 904 to perform the functions of the invention as described herein. In another exemplary embodiment where the invention may be implemented using software, the software may be stored in a computer program product and loaded into computer system 900 using, e.g., but not limited to, removable storage drive 914, hard drive 912 or communications interface 924, etc. The control logic (software), when executed by the processor 904, may cause the processor 904 to perform the functions of the invention as described herein. The computer software may run as a standalone software application program running atop an operating system, or may be integrated into the operating system.

While various embodiments have been described above, it should be understood that they have been presented by way of example only, and not limitation. Thus, the breadth and scope of the described should not be limited by any of the above-described exemplary embodiments, but should instead be defined only in accordance with the following claims and their equivalents.

The invention claimed is:

1. A method for collecting data comprising:
receiving data related to a product and internal to an enterprise across heterogeneous networks at a time of release of the data to the public;
receiving identification information identifying the data;
storing the data in an archive based on the identification information;
receiving a request from a secure environment to access the stored data from the archive;
providing the stored data from the archive to the secure environment;
providing a plurality of access levels to the secure environment;
receiving from an external user device via a network a request to access the data stored on a server in the secure environment;
providing the external user device access across a firewall to a terminal services gateway;
providing a plurality of dedicated connections from the terminal services gateway to the secure environment and from the terminal services gateway to the external user device over an internet, wherein each of the dedicated connections has its own network port;
performing a first authentication based on at least a first user credential to determine an access level from the plurality of access levels of the user;
establishing a dedicated connection from the plurality of dedicated connections over the network to the secure environment for the user device based on the access level of the user, wherein the dedicated connection to the secure environment is independent for each of the plurality of access levels and each of the plurality of dedicated connections represents one and only one security level of a plurality of security levels;
performing at least a second authentication verifying the access level determined by the first authentication based on at least a second user credential and the dedicated connection, wherein the second user credential is different than the first user credential;
providing access to data stored on the server over the dedicated connection to the external user device;
receiving a decryption password from the external user device;
mounting at least one encrypted container stored on the server based on the decryption password; and
providing data from the at least one mounted container to the user device.

2. The method of claim 1, wherein receiving data at the time of release of the data and receiving identification information identifying the data comprises:
receiving a notification of an incoming delivery comprising data, the notification comprising product version information;
initializing for receipt of the incoming delivery; and
receiving the incoming delivery at the point of release.

3. The method of claim 1, wherein the time of release comprises a date the data is released to the public.

4. The method of claim 1, wherein storing the data in the archive comprises storing the data as components.

5. The method of claim 4, further comprising:
storing snapshots of the same data at different points in time;
identifying differences in the data stored across periods of time based on the components; and
storing the identified differences.

6. The method of claim 1, further comprising at least one of preventing modification of the stored data, tracking modification of the stored data, auditing of the stored data, or auditing of the process of data collection.

7. The method of claim 1, further comprising:
receiving a request from a user device to view the data; and providing a virtualized desktop on the secure environment to the user device based on an access level.

8. The method for information collection of claim 7, further comprising:
receiving a remote desktop request from a user device authenticating the request;
providing the remote desktop to the user device;
receiving a decryption password from the user device;
mounting the at least one encrypted container based on the decryption password; and
providing data from the at least one mounted container to the user device.

9. The method of claim 7, wherein providing the virtualized desktop on the secure environment to the user device comprises at least one of converting the data or processing the data.

10. The method of claim 1, wherein storing the data in the archive comprises at least one of converting the data or processing the data.

11. The method of claim 1, wherein providing the stored data from the archive to the secure environment comprises at least one of converting the data or processing the data.

12. The method of claim 1, wherein providing the stored data from the archive to the secure environment comprises storing the data in an encrypted container in the secure environment.

13. The method of claim 12, further comprising preventing an administrator of the secure environment from accessing the contents of the encrypted container.

14. A computer-implemented system for collecting data, the system comprising:
a central processing unit (CPU) having memory storing CPU-executable instructions; and
the CPU to perform the following according to the instructions:
receiving data related to a product and internal to an enterprise across heterogeneous networks at a point of release of the data to the public;
receiving identification information identifying the data;
storing the data in an archive based on the identification information;
receiving a request from a secure environment to access the stored data from the archive;
providing the stored data from the archive to the secure environment;
providing a plurality of access levels to the secure environment;
receiving from an external user device via a network a request to access the data stored on a server in the secure environment;
providing the external user device access across a firewall to a terminal services gateway;
providing a plurality of dedicated connections from the terminal services gateway to the secure environment and from the terminal services gateway to the external user device over an internet, wherein each of the dedicated connections has its own network port;
performing a first authentication based on at least a first user credential to determine an access level from the plurality of access levels of the user;
establishing a dedicated connection from a plurality of dedicated connections over the network to the secure environment for the user device based on the access level of the user, wherein the dedicated connection to the secure environment is independent for each of the plurality of access levels and each of the plurality of dedicated connections represents one and only one security level of a plurality of security levels;
performing at least a second authentication verifying the access level determined by the first authentication based on at least a second user credential and the dedicated connection, wherein the second user credential is different than the first user credential;
providing access to data stored on the server over the dedicated connection to the external user device;
receiving a decryption password from the external user device;
mounting at least one encrypted container stored on the server based on the decryption password; and
providing data from the at least one mounted container to the user device.

15. A non-transitory computer readable medium storing computer-executable instructions for causing a computer to perform the steps of:
receiving a notification of an incoming delivery of data related to a product and internal to an enterprise;
receiving the incoming delivery at a point of release to the public;
archiving the delivery based on the notification;
receiving a request to access the archived delivery from an external user device;
receiving from an external user device via a network a request to access the data stored on a server in the secure environment;
providing a plurality of access levels to the secure environment;
providing the external user device access across a firewall to a terminal services gateway;
providing a plurality of dedicated connections from the terminal services gateway to the secure environment across an internet;
performing a first authentication based on at least a first user credential to determine an access level from the plurality of access levels of the user;
establishing a dedicated connection from a plurality of dedicated connections over the network to the secure environment for the user device based on the access level of the user, wherein the dedicated connection to the secure environment is independent for each of the plurality of access levels and each of the plurality of dedicated connections represents one and only one security level of a plurality of security levels;
performing at least a second authentication verifying the access level determined by the first authentication based on at least a second user credential and the dedicated connection, wherein the second user credential is different than the first user credential;
providing a plurality of dedicated connections from the terminal services gateway to the secure environment and from the terminal services gateway to the external user device over an internet, wherein each of the dedicated connections has its own network port;
receiving a decryption password from the external user device;
mounting at least one encrypted container stored on the server based on the decryption password;
retrieving the archived delivery based from the at least one mounted container to the user device on the request; and
providing the archived delivery to the user device.

* * * * *